United States Patent [19]

Ng

[11] Patent Number: 4,951,556

[45] Date of Patent: Aug. 28, 1990

[54] ILLUMINATED COFFEE BREWING APPARATUS

[75] Inventor: Norman Ng, San Francisco, Calif.

[73] Assignee: Smart Kids, Inc., Oakland, Calif.

[21] Appl. No.: 341,343

[22] Filed: Apr. 21, 1989

[51] Int. Cl.$^5$ .............................................. A47J 31/00
[52] U.S. Cl. ..................................... 99/285; 219/297; 219/506
[58] Field of Search ................. 99/279, 285, 293, 295, 99/280, 281, 282, 283, 284, 288, 323.5, 323.6; 426/433; 219/297, 308, 506

[56] References Cited

U.S. PATENT DOCUMENTS

| | | | |
|---|---|---|---|
| 3,392,662 | 7/1968 | Schwartz | 99/285 |
| 4,204,465 | 5/1980 | Knecht | 99/293 |
| 4,331,067 | 5/1982 | Mysieka | 99/285 |
| 4,800,805 | 1/1989 | Mahlich | 99/295 |

*Primary Examiner*—Robert W. Jenkins
*Attorney, Agent, or Firm*—Jones, Day, Reavis & Pogue

[57] ABSTRACT

A coffee brewing apparatus is disclosed which incorporates in its base a neon lamp indicator within a transparent housing which may be operated manually or automatically by a temperature sensing thermal switch to indicate proper brewing temperature and/or steam pressure.

6 Claims, 3 Drawing Sheets

ILLUMINATED COFFEE BREWING APPARATUS

BACKGROUND OF THE INVENTION

1. Field of the Invention

This invention relates to coffee brewing machines in general, and specifically to the class of automatic drip and espresso and cappucino makers designed for domestic use. More specifically it relates to those units incorporating illuminated indicators to indicate when proper brewing temperature is reached or when proper steam pressure is achieved.

2. Description of the Prior Art

The prior art in this field includes numerous examples of domestic use drip coffee makers and espresso/cappucino makers.

The prior art in this field includes automatic drip coffee makers with lighted switches to indicate the on position for the unit's heating element and hot plate, and indicator lights to show when the unit has heated the water sufficiently for the proper brewing of coffee.

Summary of the Invention

The coffee brewing apparatus embodying the present invention is an espresso/cappucino machine intended for domestic use. As with prior art units it includes several components substantially contained within a sleek, modern housing. These components may include a water reservoir, heating elements to generate both hot water for brewing coffee and/or espresso and live steam for frothing milk for cappucino.

The base of the unit includes a rest for espresso cups but does not include a hot plate as may be commonly found in regular drip coffee brewers. Also included in this unit is a steam nozzle with steam release valve for the introduction of live steam into milk to froth the milk for cappucino.

Also included in this embodiment is a neon tube lamp located within the unit's base which acts as an indication of proper brewing temperature and proper steam pressure. It also may be activated manually to illuminate the base of the unit or to flicker within the clear base of the unit by means of a flashing control during the brewing process.

DESCRIPTION OF THE DRAWING FIGURES

DETAILED DESCRIPTION OF THE PREFERRED EMBODIMENT

Figure 1:
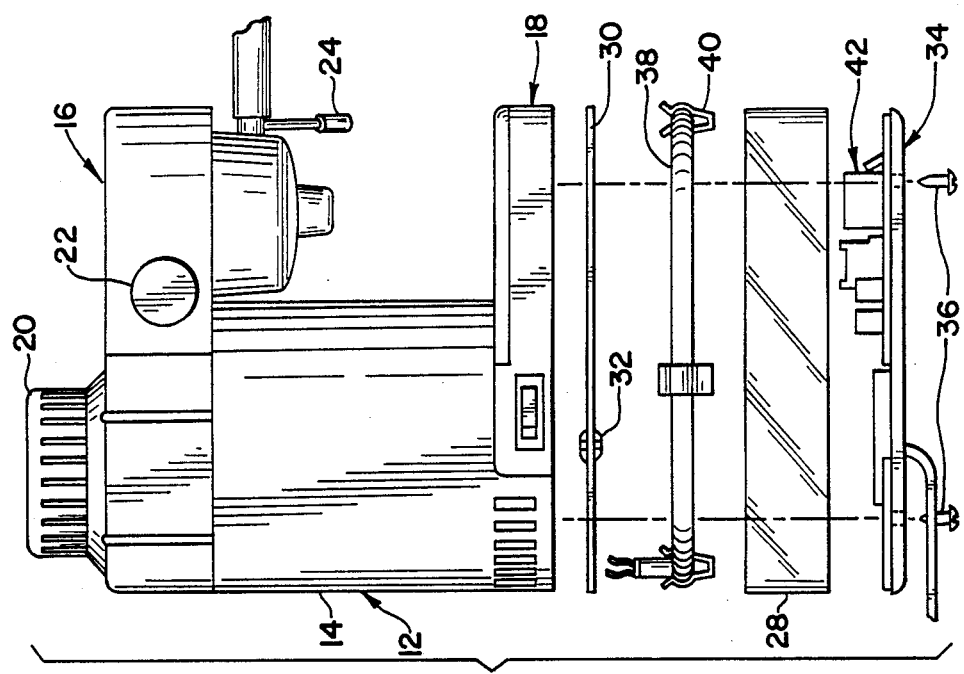
FIG. 1 is a general perspective view of the espresso/cappucino brewing machine embodying the present invention.
Figure 2:
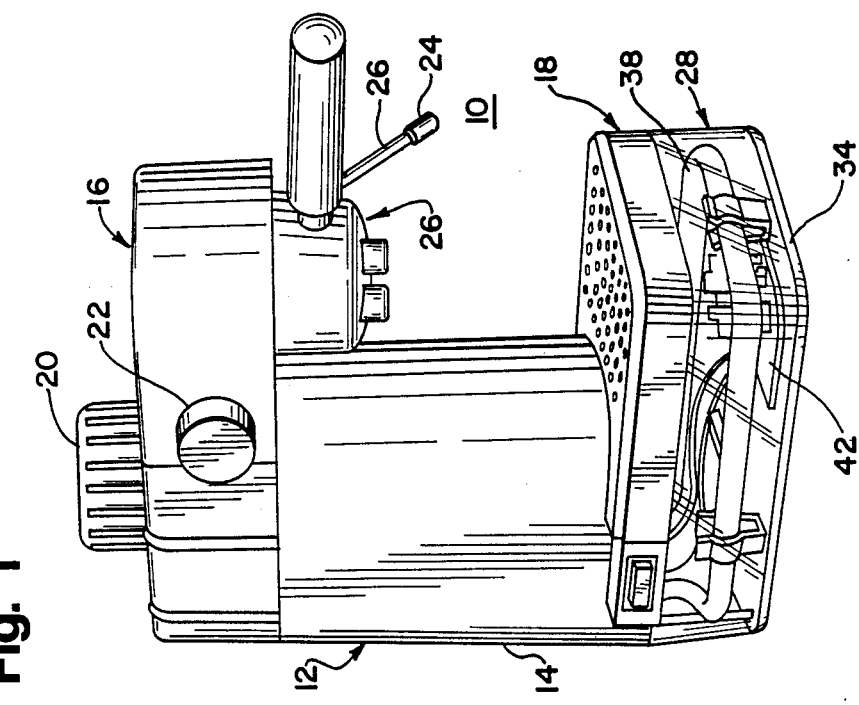
FIG. 2 is an exploded view of the espresso/cappucino machine shown in FIG. 1.

Referring now to the drawings, in FIG. 1 is shown the espresso/cappucino machine 10 embodying the present invention. An exploded view of this embodiment is shown in FIG. 2.

Included in this embodiment is housing 12 which includes vertical tank housing 14, housing head 16 and housing base 18.

Located at the top of housing head 16 is water tank pressure lid 20. On the side of housing head 16 is located steam valve handle 22 which controls the escape of live steam through steam nozzle 24, located at the end of steam conduit 26, which depends from housing head 16.

Also depending from housing head 16 is coffee filter holder 26. Filter holder 26 holds ground coffee, through which heated water is drawn to produce espresso coffee.

Below housing base 18 is located housing extension 28, which is formed of a suitable transparent material such as acrylic or other thermoplastic material.

Separating housing base 18 and base extension 28 is plate 30 which also may be formed of a transparent material. Plate 30 acts as a seal between housing base 18 and base extension 30, to prevent leakage of liquids on to the electronic components located inside base extension 28. Wiring grommet 32 is included in plate 30 to allow extension of control wires from within housing 12 to withing base extension 28. Base 34 is attached to housing base 18 by screws 36.

Located within housing extension 28, as assembled, is neon tube lamp 38, which is held by clips 40, which are attached to base 34. Neon lamp 38 may be filled with any suitable inert gas to determine the color of light produced. Also attached to base 34 are electronic control components collectively referred to by reference character 42. These control components control the operation of the neon light indicator. The neon light and low voltage power supply are incorporated into the base to be used as a water temperature indicator and also as a steam pressure readiness indicator. The unit is designed to flicker when the espresso machine is ready for operation. When the water in the tank reaches the proper temperature either for making espresso, or, alternatively, when sufficient steam pressure is reached for frothing milk, a thermal switch in the control components will engage a circuit which will make the neon light flicker on and off to indicate to the operator that the proper condition is reached and the machine is ready to use.

Housing 12 may be formed of a suitable transparent or translucent material to permit light from lamp 38 to be emitted from the housing.

Figure 3:
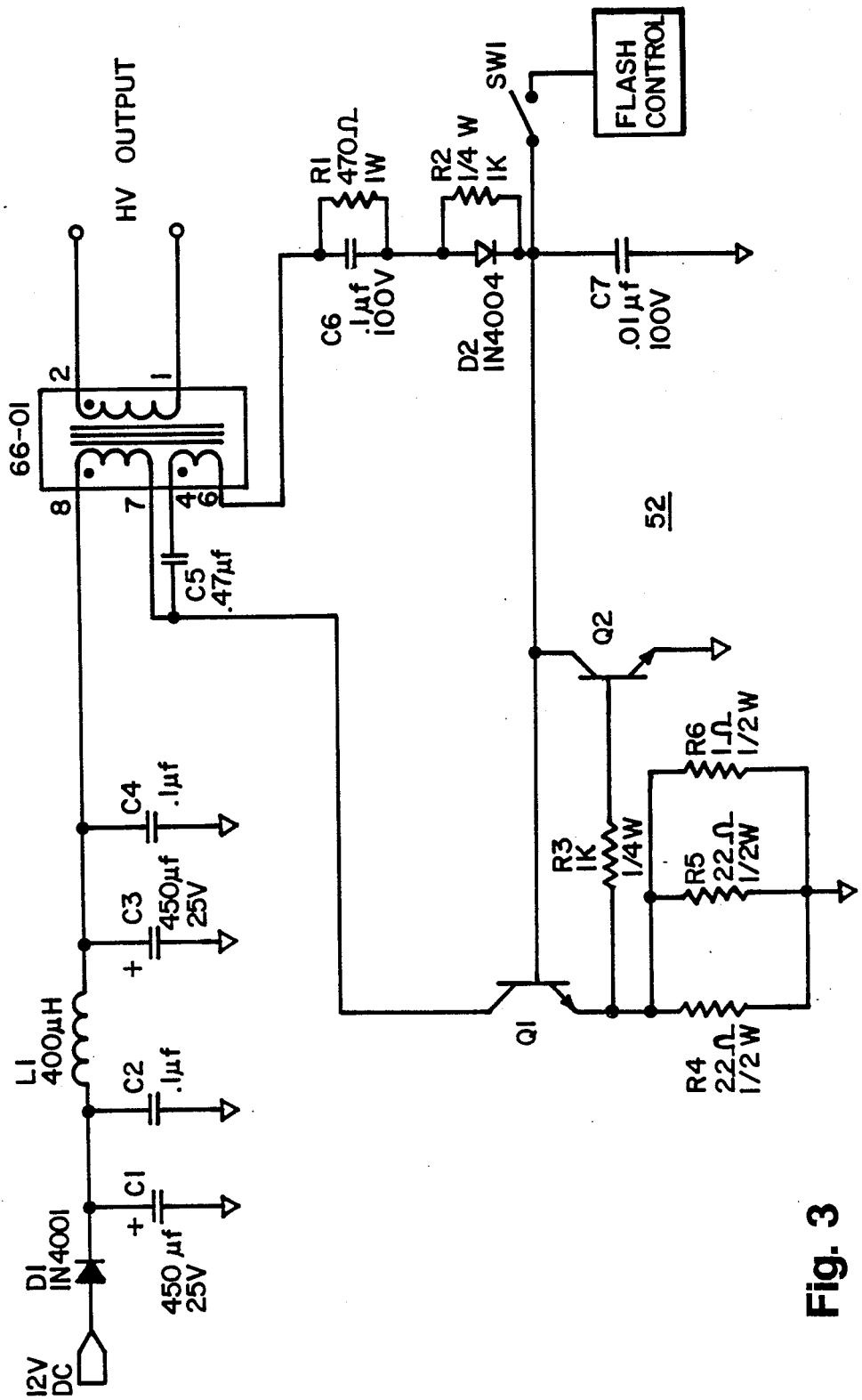
FIG. 3 is a schematic diagram of a high voltage power supply for neon tube in the base of the present embodiment.
Figure 4:
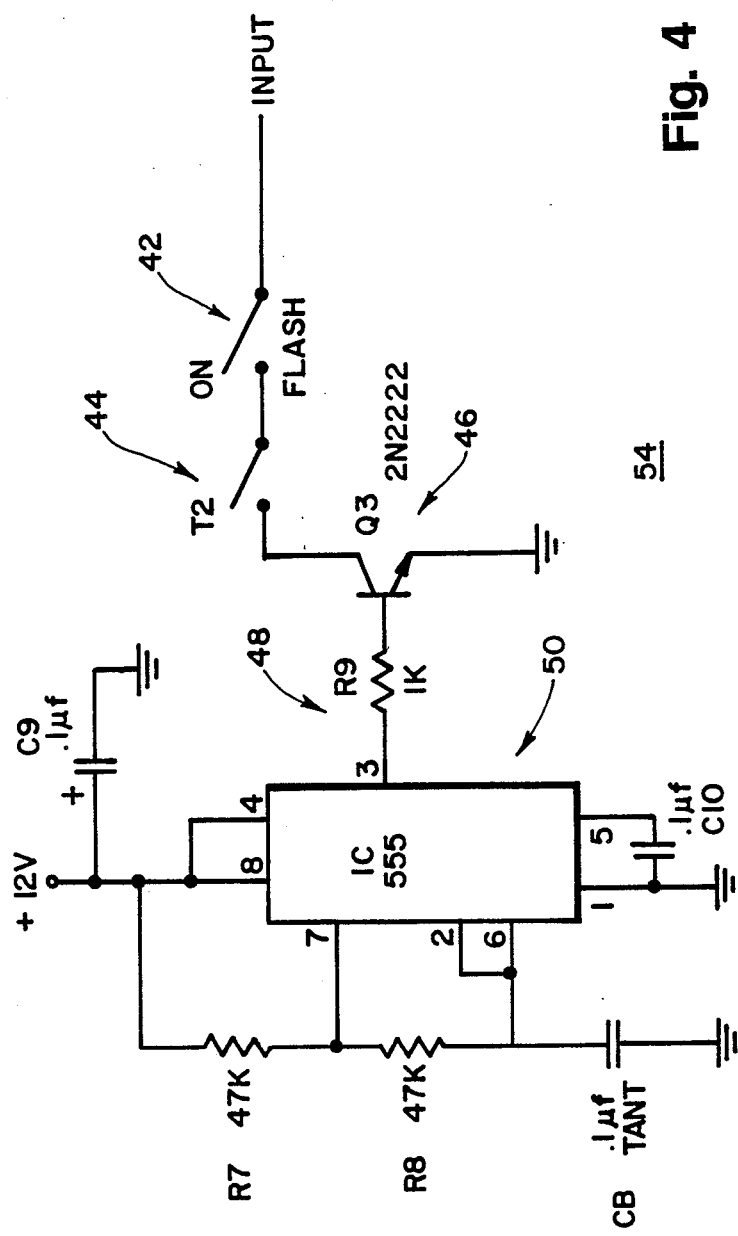
FIG. 4 is a schematic diagram of the flash control symbolically shown in the schematic diagram of FIG. 3.

The circuitry mounted to the base of the unit is schematically diagramed in FIGS. 3 and 4. This circuitry includes the following components:

Control switch 42 is a two position switch enabling the unit to operate as either an asthetic lamp or as a flickering readiness indicator. Thermal switch 44, in circuit with switch 42 is precalibrated to close at an appropriate temperature, for example, 250 degrees F. to activate the flickering circuit. Switching transistor 46 is typically a standard switching transistor such as standard industry number 2N2222 which switches the circuit on and off. Resistor 48 acts as a current limiter for the base drive of transistor 46. Integrated circuit 50 acts as a timer and oscillator for the flickering of the neon lamp. The remaining components shown in FIG. 3 serve to control the frequency and duty cycle of the neon lamps flickering. It may be typically set for a frequency 10 Hz with a duty cycle of 50/50, i e., the lamp will flicker ten times per second and will be on fifty percent of the time and off fifty percent of the time. These settings may be adjusted according to consumer taste.

High voltage power supply 52 shown in FIG. 3 is used to energize the inert gas contained in neon tube 38. Power supply 52 includes flash control 54.

The foregoing specification describes onlY the embodiments of the invention shown and/or described. Other embodiments may be articulated as well. The terms and expressions used therefore serve only to describe the invention by example and not to limit the invention. It is expected that others will perceive differences, which, while differing from the foregoing, do not depart from the spirit and scope of the invention herein described and claimed. The invention is to be limited, therefore, only by the scope of the appended claims.

I claim:

1. A coffee brewing apparatus comprising:
   a housing including a base portion and a head portion;
   means located within said housing for heating water for the brewing of coffee;
   a thermal switch associated with the heating water for generating an electrical signal when the water reaches a predetermined temperature;
   indicator means located within said base portion; and
   means coupling said thermal switch to said indicator means for using the generated electrical signal to energize the indicator means and illuminate the entire base portion to give a visual indication that the water has reached said predetermined temperature.

2. A coffee brewing apparatus as in claim 1 further comprising means incorporated within said housing for the generation of steam.

3. A coffee brewing apparatus as in claim 1 wherein said indicator means comprises a neon tube lamp.

4. A coffee brewing apparatus as in claim 3 wherein said base portion is formed of a substantially transparent material to enable light from the neon tube lamp in the base portion to be visable from the exterior of the entire base portion.

5. A coffee brewing apparatus as in claim 4 further including an integrated circuit coupled to said neon tube lamp and said thermal switch for causing said neon lamp to flicker when the water has reached said predetermined temperature.

6. A coffee brewing apparatus as in claim 1 wherein said housing is formed of a substantially non-opaque material.

* * * * *